United States Patent
Wang et al.

(10) Patent No.: US 12,034,383 B2
(45) Date of Patent: Jul. 9, 2024

(54) FABRIC TRIBOELECTRIC NANOGENERATOR

(71) Applicant: National University of Singapore, Singapore (SG)

(72) Inventors: Hao Wang, Singapore (SG); Chengkuo Lee, Singapore (SG); Tianyiyi He, Singapore (SG)

(73) Assignee: National University of Singapore, Singapore (SG)

( * ) Notice: Subject to any disclaimer, the term of this patent is extended or adjusted under 35 U.S.C. 154(b) by 257 days.

(21) Appl. No.: 17/626,725

(22) PCT Filed: Aug. 3, 2020

(86) PCT No.: PCT/SG2020/050446
§ 371 (c)(1),
(2) Date: Jan. 12, 2022

(87) PCT Pub. No.: WO2021/021028
PCT Pub. Date: Feb. 4, 2021

(65) Prior Publication Data
US 2022/0255465 A1    Aug. 11, 2022

(30) Foreign Application Priority Data
Jul. 31, 2019   (SG) .......................... 10201907061U (51) Int. Cl.
*H02N 1/04*    (2006.01)
(52) U.S. Cl.
CPC .................................... *H02N 1/04* (2013.01)

(58) Field of Classification Search
CPC ....................................................... H02N 1/04
(Continued)

(56) References Cited

U.S. PATENT DOCUMENTS

| 11,622,700 B2 * | 4/2023 | Vasandani ............ A61B 5/6831 |
| | | 600/529 |
| 2003/0142576 A1 * | 7/2003 | Iwahashi .............. G11C 7/1069 |
| | | 365/230.05 |

(Continued)

FOREIGN PATENT DOCUMENTS

| CN | 108880241 A | 11/2018 | |
| WO | WO-2018075437 A1 * | 4/2018 | ............... A61B 5/08 |
| WO | WO-2018205994 A1 * | 11/2018 | ............ H02M 3/156 |

OTHER PUBLICATIONS

TW-I270324-B (Year: 2007).*

(Continued)

*Primary Examiner* — Ahmed Elnakib
(74) *Attorney, Agent, or Firm* — Botos Churchill IP Law LLP (57) ABSTRACT

Disclosed herein are triboelectric nanogenerators (TENGs). Such TENGs comprise at least one tribolectric (TE) layer comprising two surfaces relative movement between which generates a TE charge, and a circuit. The circuit comprises a switch, a sensor, and a load. The switch has an open condition in which the TE charge accumulates (the accumulated TE charge), and a closed condition in which the accumulated TE charge discharges between the two surfaces across the load, the sensor determining a time constant (τ) of discharge of the accumulated TE charge across the load.

14 Claims, 8 Drawing Sheets

(58) Field of Classification Search
USPC ......................................................... 310/310
See application file for complete search history.

(56) References Cited

U.S. PATENT DOCUMENTS

2017/0331397 A1* 11/2017 Kim ......................... H02N 2/18
2019/0157992 A1*  5/2019 Mallineni ............. H02N 11/002
2020/0099316 A1*  3/2020 Zhang ....................... H02N 1/04
2022/0316439 A1* 10/2022 Cao ......................... F03B 13/20

OTHER PUBLICATIONS

The International Search Report and The Written Opinion of the International Searching Authority for PCT/SG2020/050446, Date of Mailing: Oct. 1, 2020.
Liu, et al., "Switchable Textile-Triboelectric Nanogenerators (S-TENGs) for Continuous Profile Sensing Application Without Environmental Interferences", Nano Energy, vol. 69, 2020, pp. 104462-1-104462-9.
Wang, et al., "A Switchable Fabric-triboelectric Nanogenerators (SF-TENGs) Profile Sensing Application", 2019, 19th International Conference on Micro and Nanotechnology for Power Generation and Energy Conversion Applications, pp. 1-4.

* cited by examiner

FABRIC TRIBOELECTRIC NANOGENERATOR

CROSS-REFERENCE TO RELATED APPLICATIONS

The present application is a national phase entry under 35 U.S.C. § 371 of International Application No. PCT/SG2020/050446, Aug. 3, 2020, published in English as International Publication No. WO 2021/021028 A1, which claims the benefit of the filing date of Singapore Patent Application No. 10201907061U filed Jul. 31, 2019, the disclosures of which are hereby incorporated by reference.

TECHNICAL FIELD

The present invention relates to triboelectric nanogenerators (TENGs). In particular, embodiments of the present invention relate to fabric TENGs for continuous sensing applications without environmental interference.

BACKGROUND

A TENG is a self-powered device that experiences contact electrification. Charge is generated in the device when one part of the device is separated from another part of the device with which it was in contact. Such contract and separation can be performed repeatedly to generate a fluctuating charge in the device.

The self-powered nature and easy fabrication of TENGs enable design of a variety of self-powered sensors for all kinds of applications. However, the accuracy and stability of such sensors can be jeopardized by interference factors such as operation speed, humidity, temperature and electrostatic coupling with the surrounding environment. Such interference factors can prevent TENGs sensors from becoming competitive with conventional commercialized sensors.

It is desirable, therefore, that a TENG device or sensor is provided that overcomes or ameliorates at least one of the above-described problems, or at least to provide a useful alternative.

BRIEF SUMMARY

Described herein are switchable triboelectric nanogenerators (TENGs) and, in some embodiments, switchable fabric-triboelectric nanogenerators (SF-TENGs). TENGs and SF-TENGs designed in accordance with present teachings can eliminate interference factors by measuring the time constant rather than the amplitude of the voltage output.

The measured time constant is a stable and accurate indicator of the instantaneous value of the sensing target. Moreover, the time constant is not affected by other interference factors such as humidity and electrostatic coupling with the environment.

As described with reference to FIGS. 4 and 5, embodiments of the present sensing approaches can be applied for both static sensing and dynamic sensing of force or bending moment. It is also clear that concepts taught herein can be easily extended to other sensing scenarios.

Disclosed herein is a triboelectric nanogenerator (TENG), comprising:
at least one triboelectric (TE) layer comprising two surfaces relative movement between which generates a TE charge; and
a circuit comprising:
a switch;
a sensor; and
a load,
wherein the switch has an open condition in which the TE charge accumulates (the accumulated TE charge), and a closed condition in which the accumulated TE charge discharges between the two surfaces across the load, the sensor determining a time constant ($\tau$) of discharge of the accumulated TE charge across the load. The TENG may be a fabric TENG, or a SF-TENG.

The TENG may be a contact-separation TENG having a releasing height determined based on spacing between the two surfaces and energy density on release.

The circuit may further comprise a diode for preventing the accumulated TE charge from discharging across the sensor during only one of pressing the two surfaces together and releasing the two surfaces to enable the two surfaces to move apart.

The sensor may be configured to determine a polarity of the accumulated TE charge based on a direction of discharge between the two surfaces. The sensor may be configured to determine a derivative of force with respect to time, based on a peak voltage of the accumulated TE charge that is discharged across the sensor.

The switch may operate cyclically based on a clock signal, each cycle comprising switching the switch from the open condition to the closed condition and back to the open condition. The clock signal may cycle the switch at a frequency of at least 20 Hz. The clock signal may instead cycle the switch at a frequency of at least 40 Hz. The clock signal may instead cycle the switch at a frequency of at least 80 Hz.

The switch may comprise a transistor. The transistor may be a metal oxide semiconductor field effect transistor (MOSFET).

The sensor may comprise the load.

The TENG may comprise a plurality of said TE layers.

Also described herein is a self-powered weight scale comprising a TENG as described above, wherein the diode prevents the accumulated TE charge from discharging across the sensor during release.

Also described herein is a gesture sensor comprising a TENG as described above, positioned to receive at least one or compressive force, tensile force and shear force during performance of a gesture.

Also described herein is a tilt angle sensor comprising a TENG as described above, positioned to receive at least one of compressive force and tensile force during variation of an angle between two bodies or parts.

Advantageously, the fabric nature of embodiments of TENGs described herein can achieve a narrow gap between the two surfaces of each TE layer. This helps increase or maximise energy density, thereby increasing or maximising the output of the TENGs.

Advantageously, a switchable operation method, as described herein, can be used for sensing applications. This helps stabilise the sensing output and eliminate environmental interference.

Advantageously, in some embodiments a MOSFET used as the switch for high frequency sensing applications. This enables an automatic sensing system to be established. In such embodiments, the MOSFET replaces the mechanical switch used in older devices, to enable the higher frequency switching. In conjunction with the MOSFET, an algorithm is described herein that uses the voltage amplitude to correct errors in sensing data and to ensure sensing accuracy.

This new sensing method can remove the interference from the environment and generate continuous profile of the sensing parameter.

BRIEF DESCRIPTION OF DRAWINGS

Embodiments of the present invention will now be described, by way of non-limiting example, with reference to the drawings in which.

DETAILED DESCRIPTION

TENGs described below are able to correct for interference factors that often limit the operation and viability of similar known devices. In some embodiments, this advancement is at least partially achieved by developing an algorithm to correct for errors such as coupling with the environment. Such an algorithm, when implemented in a TE device described herein, can produce a measurable, and thus tangible, output in the form of an error corrected sensor measurement—e.g. of force or bending moment. While the embodiments described herein generally reference a fabric TENG, it will be understood that TENGs operate by virtue of charge generation/accumulation and release between two surfaces that move relative to each other. This function is not reliant on the type of material to which those surfaces are attached (provided that material does not adversely affect the accumulation and release of charge) and, therefore, the same teachings will be understood to extend to non-fabric applications such as those that may be employed in, for example, some types of weight scale.

Figure 1:
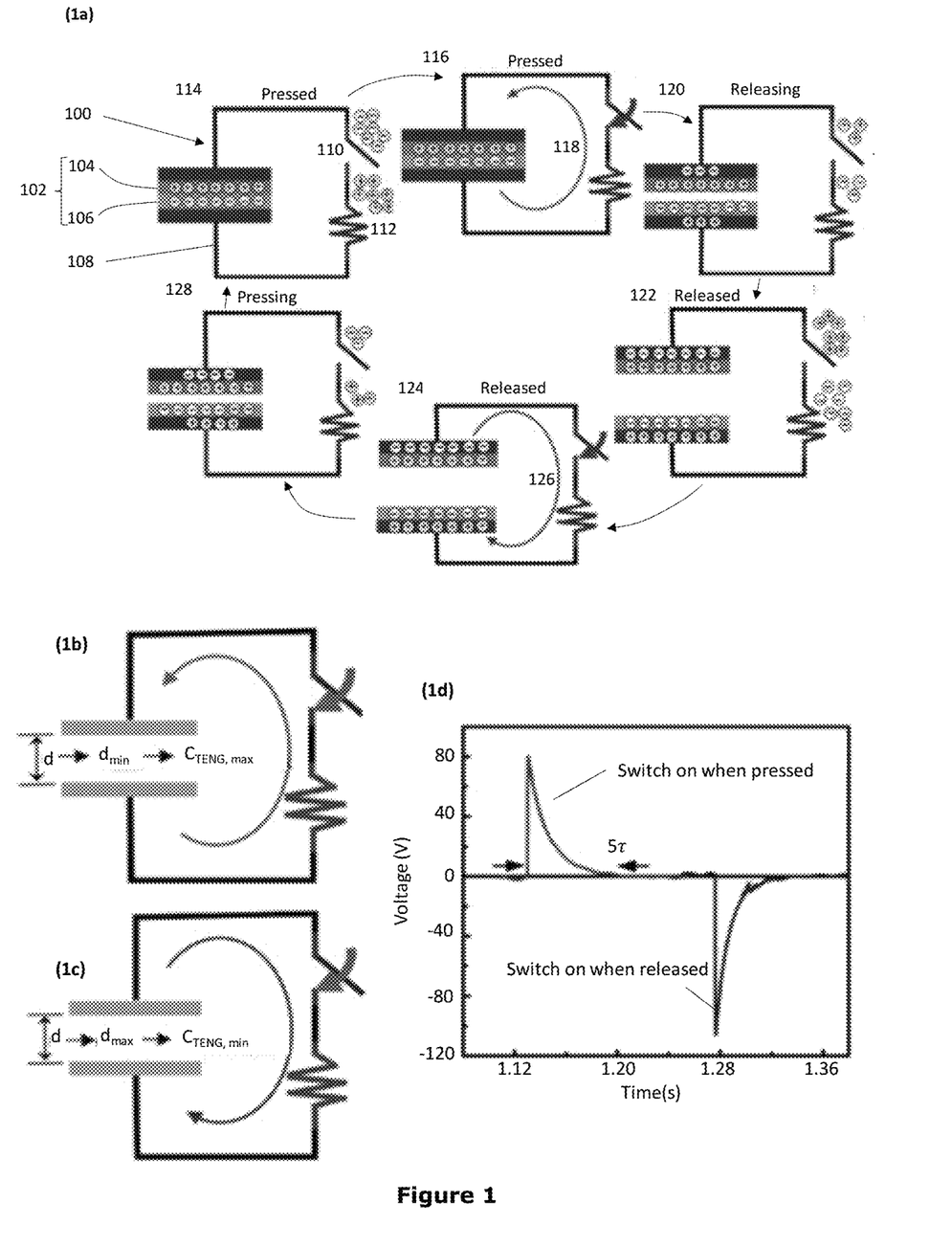
FIG. 1 illustrates the working principle of the switchable TENGs and the optimization for the energy density p.

It is useful to first understand the working principle of TENGs and, in particular, switchable TENGs. FIG. 1 illustrates that working principle and the optimization for the energy density ρ.

FIG. 1a schematically illustrates a circuit connection produced in a switchable TENG 100, the operation cycle and working mechanism. The TENG 100 at least one TE layer 102 that includes two surfaces 104 and 106 the relative movement between which generates the triboelectric charge. The TE layer 102 youth in, or forms part of, a circuit 108 that includes a switch 110 and a load 112. In some embodiments, the sensor may be considered to comprise the load or vice versa.

In step 114 of FIG. 1, surfaces 104 and 106 are in contact. When surfaces 104 and 106 are fully pressed together (i.e. the spacing of the device (that between layers 104 and 106) d, is at a minimum dmin) as shown in step 116, the switch 110 closes and electrons migrate around the circuit in the direction of arrow 118. During release, an initial stage of which is step 120, the switch 110 is open to prevent discharge, and surfaces 104 and 106 move apart to create a gap therebetween. Once the gap between surfaces 104 and 106 is at a maximum, dmax, as shown in step 122, the switch 110 again closes as shown in step 124. The charge accumulated between surfaces 104 and 106 discharges around the circuit 108 in the direction of arrow 126. Given FIG. 1a indicates cycling cooperation, after depletion of accumulated energy, the surfaces 104 and 106 again begin to approach each other as indicated by step 128.

During the operation cycle, the switch is closed only when the surfaces 104 and 106 are fully pressed together—when the spacing of the device, d, reaches the minimum, dmin (step 116)—and when those surfaces 104 and 106 are fully released—when d reaches maximum, dmax (step 124). The closing of the switch accumulates energy in step 116, and depletes the energy accumulated in the TENGs device to induce an RC discharging and generate an exponential voltage waveform in step 124. According to the current flow direction (arrows 118 and 126), the polarity of the exponential voltage can be reversed as shown in FIG. 1d.

The equivalent circuit of the switchable TENG at step 116 is shown in FIG. 1b, and the equivalent circuit of the switchable TENG at step 124 is shown in FIG. 1c. The output characteristics of switchable TENGs across the load, when the switch is closed at dmin and dmax respectively is shown in FIG. 1d, where the internal resistance of the load is 10 MΩ.

Figure 2:
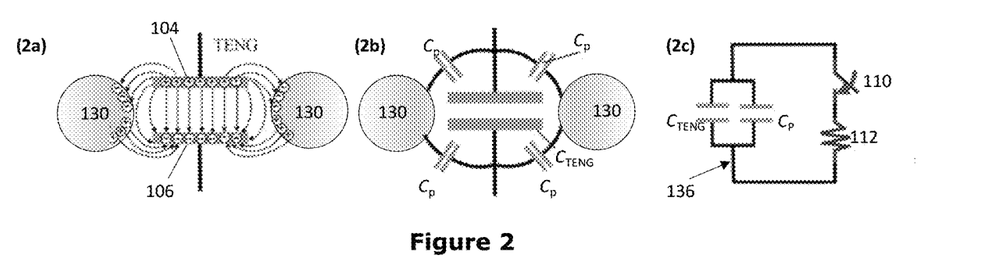
FIG. 2 depicts parasitic coupling between a TENG and nearby objects, and an equivalent circuit for the system including that parasitic coupling.

FIG. 2 depicts the electrostatic interference of nearby objects on the switchable TENG. The electrostatic charges of the two triboelectric layers 104 and 106 are partially coupled with nearby objects 130. FIG. 2a illustrates the coupling and FIG. 2b shows the parasitic capacitance Cp generated between the triboelectric layers 104 and 106 and the nearby objects 130, and the desired, triboelectric capacitance CTENG. FIG. 2c depicts the equivalent circuit for modelling the effect of the Cp on the output of the TENG.

Figure 3:
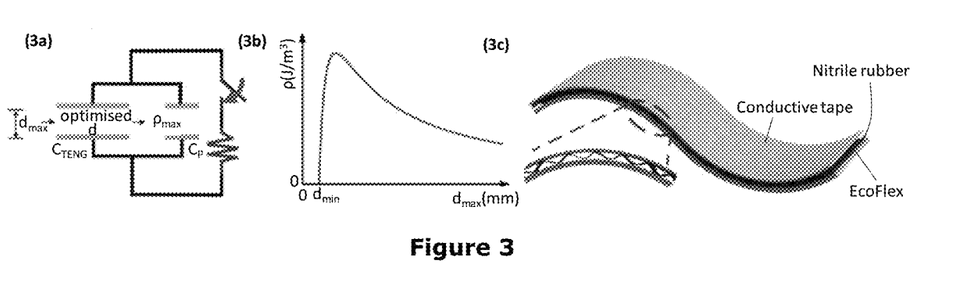
FIG. 3 schematically demonstrates optimisation of the maximum gap height between surfaces of the TE layer of a TENG, and a possible combination of materials which the TE layer may be formed.

FIG. 3 shows the relationship between energy density ρ and the maximum distance between layers 104 and 106 on release dmax. FIG. 3a illustrates the equivalent circuit, FIG. 3b shows the expected output and FIG. 3c is a schematic depiction of the structure of a soft, fabric based TENGs with optimized dmax.

With further reference to FIGS. 2 and 3, the energy density for the switchable TENGs system can be optimised. Firstly, the parasitic capacitance induced by the electrostatic coupling is considered for the expression of the energy output. The electric field induced by the electrostatic charge produced by triboelectrification is not all confined within the TENGs device but also partially coupled into the surrounding objects shown in FIG. 2a. This effect is a parasitic capacitance that can be modelled as some parasitic capacitors Cp as shown in FIG. 2b. This is similarly modelled as CP (combining all parasitic capacitances) connected in parallel with the capacitance of the TENGs device, $C_{TENG}$, as shown in FIG. 2c. The energy stored in the system can thus be expressed as:

$$E = \frac{1}{2} \times \frac{Q^2}{C_p + C_{TENG}}$$

The energy output, $E_{output}$, during the operation can be considered as the energy change of the system, $\Delta E$, expressed as:

$$E_{output} = \Delta E = E_{max} - E_{min} = \frac{1}{2} \times \left( \frac{Q^2}{C_p + C_{TENG_{min}}} - \frac{Q^2}{C_p + C_{TENG_{max}}} \right);$$

in which Q is the charge upon the device when modelled as a capacitor (i.e. the charge quantity on the contact surfaces 104 and 106). In this expression, $C_{TENG}$ can be expressed as:

$$C_{TENG} \approx \varepsilon \frac{A}{d}$$

The capacitance of the fully released device is then:

$$C_{TENG_{min}} = \varepsilon \frac{A}{d_{max}}$$

while the capacitance of the fully pressed device is:

$$C_{TENG_{max}} = \varepsilon \frac{A}{d_{min}}$$

In the above equations, A and d refer to the area and spacing of the TENGs device, respectively. The energy density, $\rho$, of the system can then be expressed as a function of $d_{max}$, since $d_{min}$ is a non-zero constant, as:

$$\rho = \frac{E_{output}}{A \times d} = \frac{1}{2} \times \frac{\frac{Q^2}{C_p + \varepsilon \frac{A}{d_{min}}} - \frac{Q^2}{C_p + \varepsilon \frac{A}{d_{max}}}}{A \times d_{max}} = f(d_{max})$$

Then consider two conditions when $d_{max} = d_{min}$ and $d_{max} \to \infty$:

$$\rho_{d_{max}=d_{min}} = 0$$

$$\rho_{d_{max} \to \infty} = 0$$

The energy density at these two extreme conditions is zero as plotted in FIG. 3b. Given the deviation from zero between those extrema, there should be an optimized maximum gap $d_{max}$ to achieve a maximum energy density $\rho_{max}$.

Figure 4:
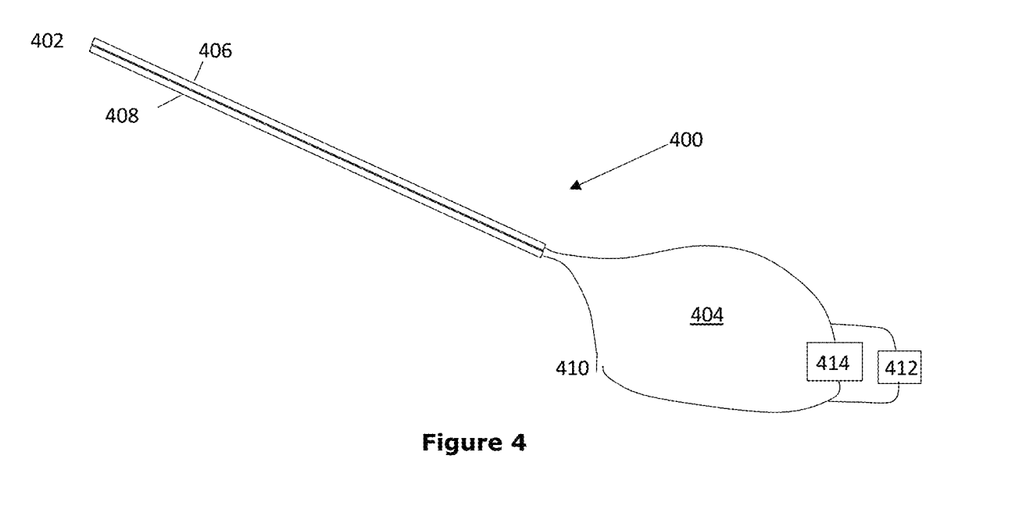
FIG. 4 schematically depicts a fabric TENG in accordance with present teachings.

A device 400 for which the energy density can be optimised is shown in FIG. 4. The device 400 is a TENG, presently a switchable fabric TENG (SF-TENG), comprising a triboelectric (TE) layer 402 and a circuit 404. The SF-TENG comprises two surfaces 406, 408, relative movement between which generates a TE charge. The circuit 404 comprises a switch 410, a sensor 412 and a load 414. The sensor 412 is presently shown as being across the load 414.

The switch 410 has an open condition in which the TE charge accumulates (the accumulated TE charge), and a closed condition in which the accumulated TE charge discharges between the two surfaces 406, 408 across the load 414. To correct for interference factors, the sensor 412 determines a time constant ($\tau$) of discharge of the accumulated TE charge across the load 414.

While the embodiment shown in FIG. 4 includes only a single TE layer 402, other embodiments may include multiple TE layers. The multiple TE layers may be stacked atop one another, generally co-planar, or may be spaced apart. One or more TE layers, in embodiments comprising multiple TE layers, may share a circuit. Alternatively, or in addition, there may be multiple circuits in a TENG, each circuit comprising, or being connected to, one or more of the TE layers of the TENG.

The SF-TENG 400 generates charge by contact and release between different surfaces of the TE layer 402. To that extent, the SF-TENG 400 is a contact-separation TE NG having a releasing height, or release height dmax, determined based on spacing between the two surfaces and energy density on release.

Figure 5:
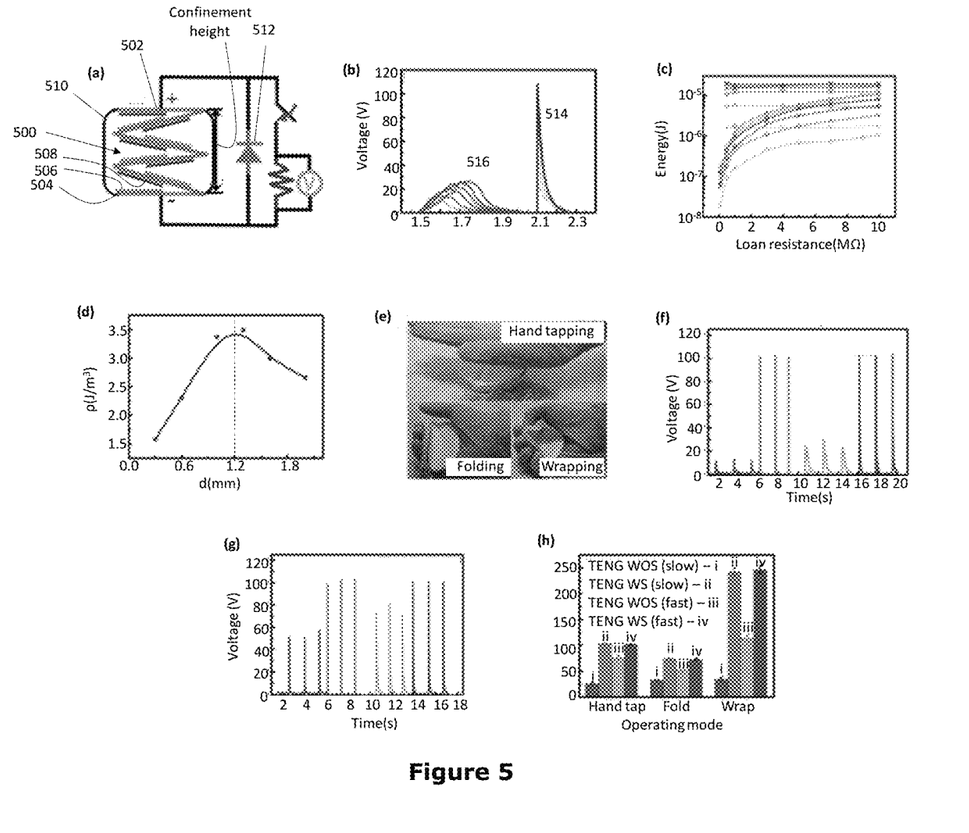
FIG. 5 shows the testing and optimization of the maximum spacing between surfaces in the TE layer ($d_{max}$) and the characterization of SF-TENGs.

Testing was conducted on a device such as that shown in FIG. 4, and the optimized $d_{max}$ was found to be a relatively small value—characterised in detail in FIG. 5. To achieve maximum energy density, a soft fabric-based TENGs device with narrow gap was designed to fit the optimized $d_{max}$ as shown in FIG. 3c. The TE layer can be fabricated from various materials. For testing, a nitrile rubber and EcoFlex™ 00-30 were utilized as positive and negative tribo-materials (e.g. surface 104 and 106) respectively owing to their soft nature and large electronegativity difference.

EcoFlex™ 00-30 was prepared, firstly, by mixing Parts A and B (EcoFlex™ 00-30) with either volume or weight ratio of 1:1. These parts were dispersed thoroughly for about 3 minutes, then the blend was uniformly coated on a Ni electrode and baked at 70° C. in an oven for about 30 minutes. Single sided conductive Ni fabric tapes were used for both electrodes. The gap distance created by the folds on the nitrile rubber generally fit the optimized value, which is measured as 0.25 mm in FIG. 5.

FIG. 5 shows the testing and optimization of the maximum spacing between surfaces in the TE layer (dmax) and the characterization of SF-TENGs.

To explore the optimization spacer distance dmax, a testing configuration comprising a 5-layer zigzag TENG 500 was used as shown in FIG. 5a. Such a configuration enables well-controlled spacing. The basic zigzag structure 502 was formed from aluminium. A polyethylene terephthalate (PET) layer 504 was used to attach the nitrile rubber 506 and Eco-Flex 508 layers to the aluminium structure. The effective area of the TE layers was 6×6 cm2 and all layers were connected in parallel. The zigzag structure 500 was contained in a confinement structure 510, having a confinement height, the confinement height limiting separation of the layers 506, 508—i.e. defining dmax. The dmax of the TENG is equal to the height difference when the device is fully pressed and released. dmax was controlled by controlling the releasing height—presently, control was exercised via confinement structure 510 (e.g. a casing or frame).

For a better study of the output of releasing, a diode 512 was added to remove the voltage output during pressing—in other words, the output was limited to that resulting from releasing, only. Similarly, when studying voltage accumulation, a diode may be added to remove the voltage output during release. In each case, the diode prevents the accumulated TE charge from discharging across the sensor during only one of pressing the two surfaces of the TE layer together and releasing those two surfaces to enable them to move apart.

To compare the output characteristics of TENGs with a switch (TENG-WS) and without a switch (TENG-WOS), the voltage output with different dmax and load resistance were measured. FIG. 5b shows the output voltage curves for TENG-WS and TENG-WOS for various dmax from 0.3 mm to 2 mm. The data samples were collected to a load resistance of 10 MΩ. As seen, the voltage 514 for TENG-WS is always an exponential waveform while the ones 516 for TENG-WOS are broad peaks. The output energy can be further calculated from the exact waveforms as shown in FIG. 5b-showing the effect of varying dmax and load resistance on the output energy of TENG-WS and TENG-WOS, as shown in FIG. 5c. Since the load resistance is the exclusive energy consumer in the circuit, the output energy should not change with load resistance, which is confirmed by the curve of TENG-WS. Then the effect on energy density of changes in dmax is shown in FIG. 5d. As seen, it follows generally the same curve as that shown in FIG. 3b and the optimized value for the dmax for a 5-layer device is 1.2 mm. Given the structure 500 is a 5-layer, zigzag structure, and the 1.2 mm applies to the combined height of all layers in the structure, then the dmax for a single layer is about 0.24 mm or 0.25 mm. Now the SF-TENGs can be prepared based on the optimized dmax.

Due to the soft nature of fabric materials, a SF-TENG can be operated in several different modes, such as tapping, folding and wrapping as shown in FIG. 5e. One of the advantages for SF-TENGs is that the voltage amplitude is not affected by the operation speed. For conventional TENGs, which is a TENG-WOS here, the voltage amplitude will increase with contact-separation speed—e.g. the tapping speed. However, a fabric device always follows a gradual contact-separation pattern, introducing a slow contact-separation speed. Thus, fabric-based TENGs normally cannot achieve a high voltage output. However, for embodiments incorporating a switch, TENG-WS, the energy can be accumulated before release. The tapping speed therefore does not affect the output, as shown in FIGS. 5f and 5g which show tapping at both low and high speed. FIG. 5h summarizes the voltage amplitude with different operation speed for TENG-WS and TENG-WOS in the three operation modes reflected by FIG. 5e, where the load resistance is 8.3 MΩ. Clearly, for all three operation modes the speed of performance of the action—tapping, folding and wrapping—did not substantially affect the output voltage.

As demonstrated above, the time constant, τ=RC, refers to how the device is squeezed either by force (i.e. force acting normally through a plane of the TE layer) or bending. As a result, interference factors, which do not affect the capacitance of the device, can be eliminated by the measurement of τ. Thus, the effect of humidity can be substantially (i.e. in substance) eliminated. The capacitance is calculated as C≈εA/d, where the humidity has no effect on either the area A, or the spacing d, and only has a slight effect on the permittivity ε. Therefore, a new sensing mechanism is described herein, involving measuring the time constant τ, for stable and reliable TENGs sensors.

To further investigate the present applications of SF-TENGs, two general and fundamental sensing scenarios are demonstrated—static sensing and dynamic sensing. In the future, various sensing applications can be developed based on these two scenarios.

Static Sensing

Figure 6:
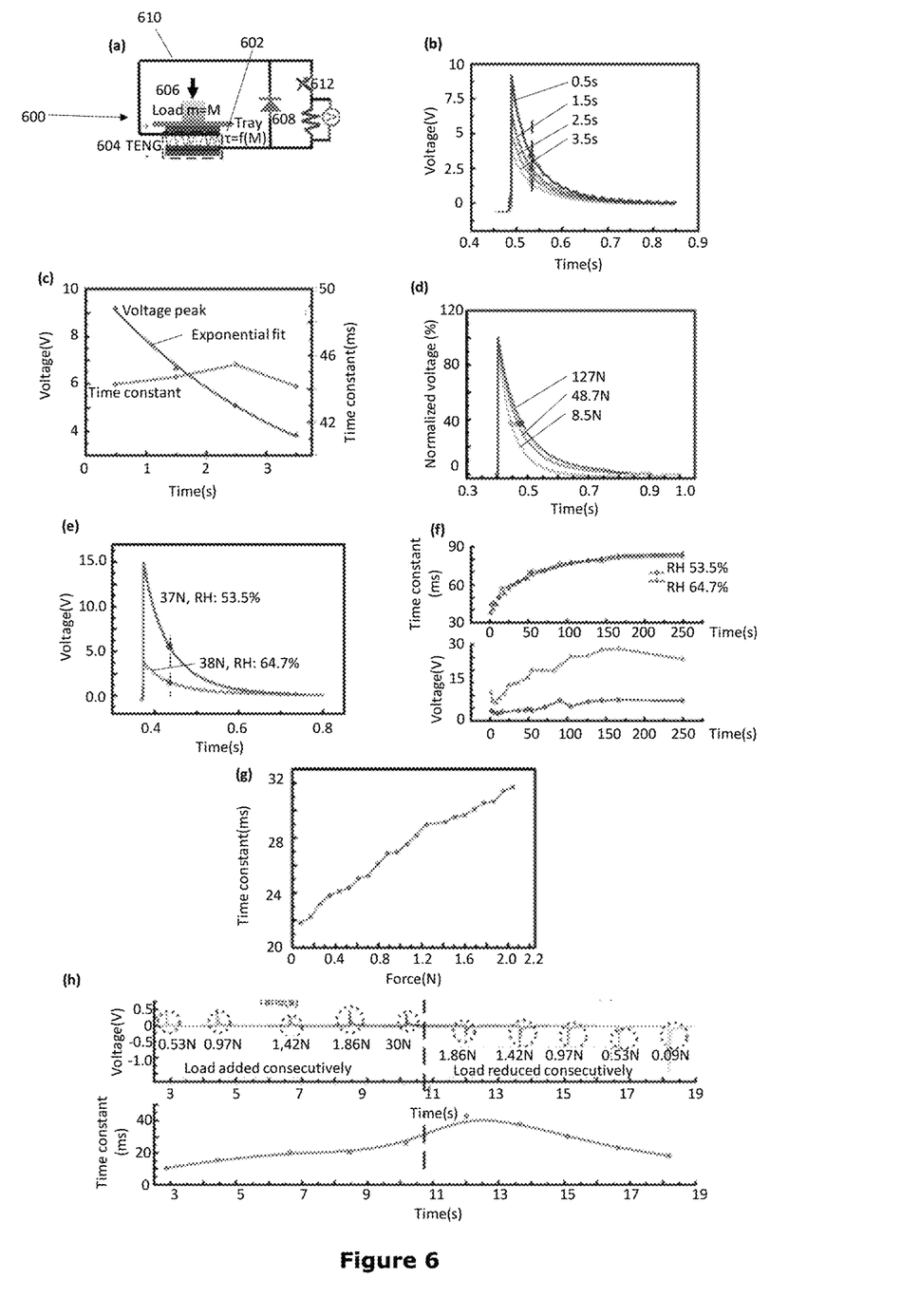
FIG. 6 demonstrate outputs for static sensing scenarios.

FIG. 6 demonstrates outputs for static sensing scenarios—one of the direct applications of SF-TENGs is a self-powered weight scale, a testing configuration 600 of which is shown in FIG. 6a. A tray 602 is put on the device 604 to uniformly distribute the weight of an object or load 606. The voltage waveform is measured for a fixed resistance of 8.3 MΩ.

Four weight measurement only the waveform of pressing is required. A diode 608 is therefore incorporated into circuit 610 to remove the interference of the releasing signal. An object 606 is put on the 602 tray the switch 612 is then pressed to generate an exponential voltage waveform—see FIG. 6b, showing the resistor capacitor (RC) discharge voltage waveform using different time intervals between which the object 606 is placed on the tray 602 and the switch 612 is closed. The time constant τ is then measured to calibrate or determine the exact weight.

Since this is a manual operation—i.e. the switch 612 is operated manually—the time interval between facing the object 606 on the tray 602 and activating the split 612 switch will affect the amplitude of the output voltage because of energy dissipation over time. FIGS. 6b and 6c show the effect of this time interval on the voltage amplitude and the time constant—FIG. 6c showing the amplitude and τ of the waveforms in FIG. 6b. The time points for calculating τ, where the amplitude decreases to 1/e of the relevant peak value, are labelled as points in FIG. 6b. With further reference to FIG. 6b, despite the amplitude decrease over this time interval, τ remains almost constant. FIG. 6c summarizes the derived from FIG. 6b. FIGS. 6d to 6f show the effect of the weight and humidity on the voltage amplitude and time constant. The τ increases with weight (FIG. 6d-normalised voltage waveforms for different weights based on tray 602) but is not affected by the humidity (FIG. 6e-voltage waveforms the same weight under different levels of relative humidity). Meanwhile, the humidity has a significant effect on the amplitude.

The results of calibrating of the device 600 under variations in humidity and weight are shown in FIG. 6f, which provides the weight-τ curve (top figure) and weight-voltage peak curve (bottom figure) for different relative humidity levels. In the top figure, two curves of the measured τ are shown. Each curve is the measurement of τ for different loads 606. One of the curves was measured in a relative humidity of 53.5%, whereas the other curve was measured in a relative humidity of 64.7%. Different humidity levels almost have no effect on the time constant. In contrast, for the curves of measured voltage, an increase in relative humidity of around 10% causes a voltage drop of about 80%. This test clearly demonstrates that the measurement of the τ can effectively remove the interference of humidity in sensing applications.

Notably, the whole τ curve is not linear. It will be more linear and sensitive at small force range. Thus, a very detailed calibrated from 0~2 N is shown in FIG. 6g. In this small force range the curve appears to be generally linear. Considering that a soft device can also be folded rather than be pressed, it can also be used to measure hand grip strength when the device is folded by hands, as shown in FIG. 5e.

A natural extension of this scenario is one in which the force applied is not static but is instead dynamically changing. It would be useful to determine if a SF-TENG can sense the force profile in such a scenario since a lot of real-world weighing applications involve at least some dynamic load. In operation of SF-TENGs, a criterion for voltage generation on closing the switch is that there is or has been a force change. If the switch is closed when the force is changed, the changing profile of the force can be sensed.

A simple demonstration is shown in FIG. 6h, which demonstrates continuous weight sensing. Five 45-gram weights are put on the tray one by one then removed one by one. The switch is closed for each change of the number of weights to generate a series of voltage peaks as shown in FIG. 6h. In these cases, the diode in FIG. 6a is removed since now we need to sense the output voltage from both the pressing and releasing procedures. As seen, the peaks are positive for weight increases and negative for weight decreases. This means the polarity can show the changing trend of the force. The sensor in this embodiment is therefore configured to determine the polarity of the accumulated TE charge based on a direction of discharge between the two surfaces of the TE layer or layers.

The measured τ of each signal generally shows the force profile. Notably, the maximum τ does not happen at the maximum weight but has one signal delay, which is the signal after the maximum weight. Meanwhile, the end of the curve does not recover to its initial value. This is because of the response time of fabric materials. It takes some time for the fabric to reach the equilibrium deformation when an external force is applied, which can be considered as a response delay. The device may be further optimized to overcome this issue, for example by using a fabric (or non-fabric material as the case may be) with higher spring constant with consequently faster mechanical recovery to its original configuration after release of the external force.

Dynamic Sensing

Figure 7A:
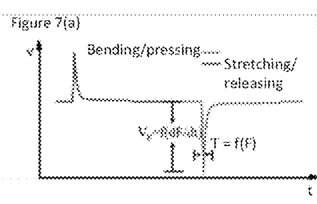
FIGS. 7(a) to 7(o) demonstrates outputs for dynamic sensing scenarios.
Figure 7B:
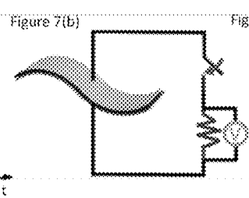
Figure 7C:
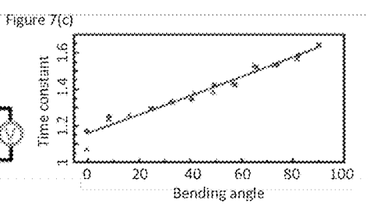
Figure 7D:
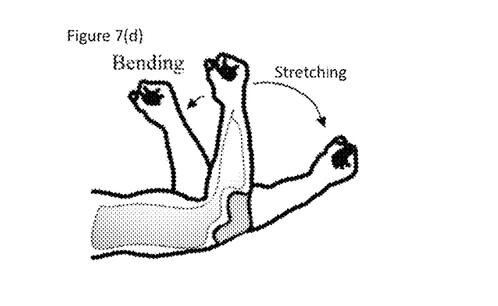
Figure 7E:
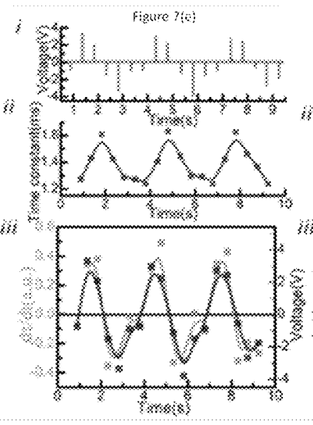
Figures 7F, 7G:
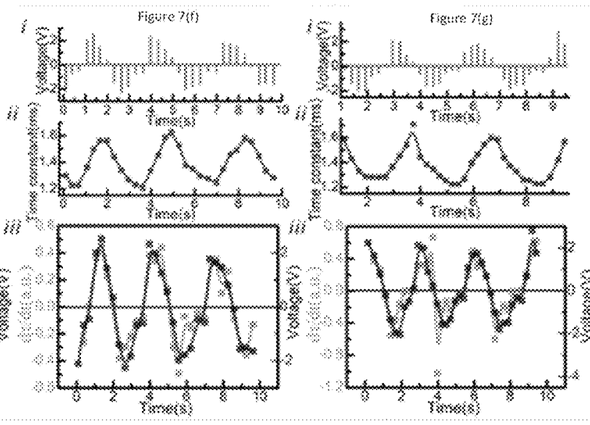
Figure 7H:
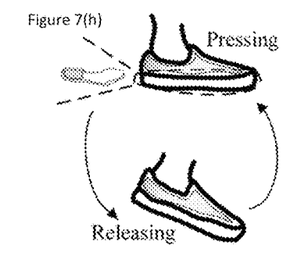
Figure 7I:
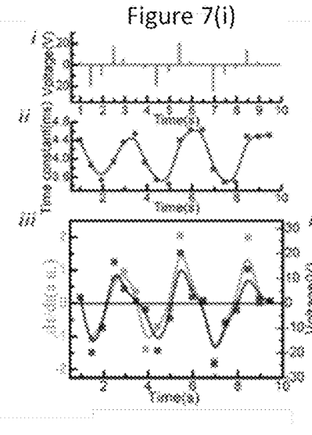
Figure 7J:
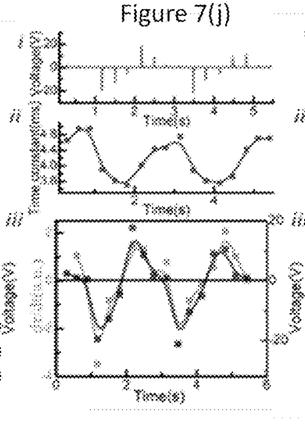
Figure 7K:
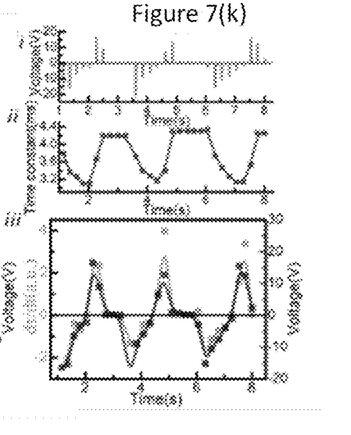
Figure 7L:
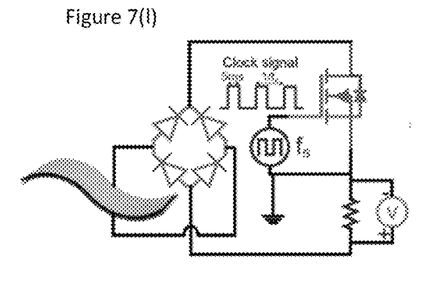
Figure 7M:
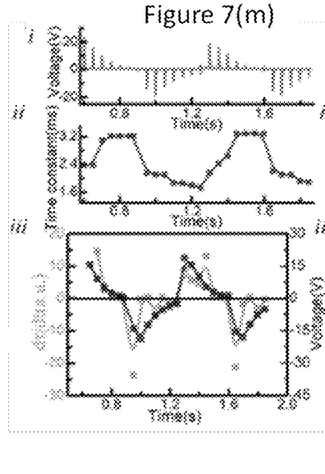
Figure 7N:
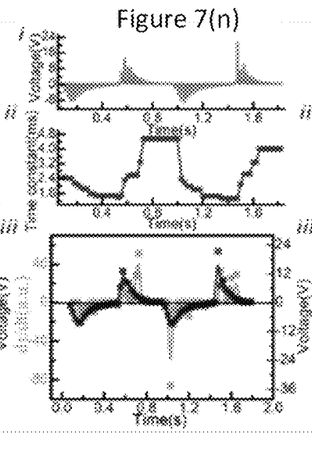
Figure 7O:
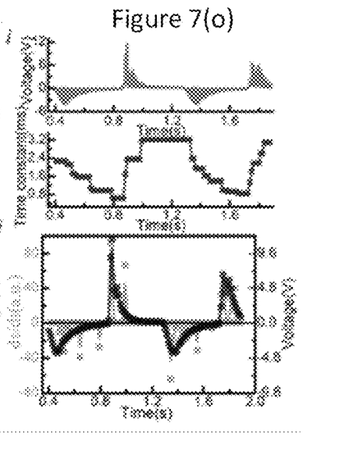

FIGS. 7(a) to 7(o) demonstrate outputs for dynamic sensing scenarios. In applications involving sensing a dynamically changing force, the tapping frequency of the switch (the switching frequency $f_s$) can be increased to acquire a smoother force profile. A comprehensive explanation for the data analysis is illustrated in FIG. 7a. As shown, the polarity represents the working condition of the device—positive peaks refer to stretching as measured by an angle sensor and releasing as measured by a force sensor, and negative peaks refer to bending as measured by the angle sensor and pressing as measured by the force sensor. These sensors were incorporated into the circuit shown in FIG. 7b. τ represents the sensing output and is a function of the applied force as shown for the bending angle in FIG. 7c. The voltage amplitude represents the derivative of the sensing output, which is dF/dt in force sensor and dθ/dt in angle sensor. There are therefore three data dimensions from which to decode the force. The first dimension is from the polarity of the output, which is determined by the operation performed by the surfaces of the TE layer—e.g. pressing/releasing, bending/stretching. According to the exact application, it is defined that pressing or bending the device generates positive peaks while releasing or stretching the device generates negative peaks. Secondly, the exact amplitude of the peaks relates to the derivative of force with respect to time, dF/dt. Since the voltage amplitude refers to the energy generated during the time interval between two switching operations, $\Delta t \approx 1/f_s$, the voltage peak, Vp, can be considered a function of generated energy, E. Meanwhile, the generated energy is proportional to the force change over Δt, then Vp is a function of dF/dt, as calculated by:

$$V_p = f(E) = f(\Delta F) \approx f\left(\frac{dF}{dt} \times \Delta t\right) \approx f\left(\frac{dF}{dt} \times 1/f_s\right) = f\left(\frac{dF}{dt}\right)$$

when $f_s$ is a constant.

As a result, a curve of dF/dt can be plotted from the acquired data. Thirdly, for each peak, τ is the result of the exact force at the time point when the switch is closed. As a result, a curve of force with respect to time can be plotted. Moreover, since τ is proportional to F, dτ/dt also refers to dF/dt. Theoretically, the two curves of dτ/dt and dF/dt will match with each other.

Here, two dynamic sensing scenarios are investigated. One involves sensing the bending angle of an elbow by attaching the device on the inner side of a cloth that passes around the outside of the elbow as shown in FIG. 7d. Another is to sense stepping force of a foot by attaching the device inside a shoe at the heel position as shown in FIG. 7h. The circuit used in dynamic sensing shown in FIG. 7b is a bit different from the one used in static sensing: the diode is removed.

FIGS. 7c to 7g shows the angle sensing of the device placed at the elbow. FIG. 7c provides a detailed τ-θ curve showing the relationship between the bending angle, θ, of the elbow and the measured τ. A dynamic sensing procedure was then performed by continuously bending and stretching the arm between 0° and 90° at different sampling frequency, $f_s$, ranging at 2 Hz, 3 Hz and 4 Hz respectively as shown in FIGS. 7e to 7g. Sampling was achieved by hand tapping. In each of FIGS. 7e to 7g (the same applying to FIGS. 7i to 7k and 7m to 7o), the top figure (i) shows the raw data from the recording, being a measurement of output voltage over time, the middle figure (ii) is the exact decoded τ value for each peak, and the bottom figure (iii) is a calibration curve, for dτ/dt, and voltage peak Vp curve from which a θ curve can be further decoded.

Based on the τ curves (plot (ii)), the derivative curves of dτ/dt (plot (iii)) are plotted. As a comparison, the curves of the voltage peak, Vp, (plot (i)) are also plotted. This Vp curve represents the derivative of the bending angle, dθ/dt. As seen, the form of curves of dτ/dt and Vp match, validating the theory. Meanwhile, a higher $f_s$ can achieve a higher sensing resolution.

FIGS. 7h to 7k show the force sensed during foot stepping. The data is recorded and analyzed in the same way. Since the detailed τ-F curve has been calibrated in FIGS. 6f to 6g, the calibration is not repeated here. The foot stepping upon the device is repeated with the same sampling frequency $f_s$ from 2 Hz (FIG. 7i), 3 Hz (FIG. 7j) and 4 Hz (FIG. 7k) respectively. Similar to the elbow sensing application, a higher $f_s$ can achieve a higher sensing resolution. During testing in the foot stepping application, the stepping force was maintained for a period. Maintaining the force can be reproduced or identified in the sensing results when $f_s$ is 4 Hz. Also as confirmed in its (iii) figure, in the duration of force keeping, the value of the derivative is zero—see FIG. 7k, plot (ii).

To achieve a better sensing resolution, a higher $f_s$ is preferred. However, it is out of the capability of handing tapping to reach much higher, consistent, sampling frequency (i.e. switching frequency). A simple alternative approach is to replace the mechanical switch with an electronic or clock signal cycled switch, such as a transistor. One example is a metal oxide silicon field effect transistor (MOSFET). Each cycle may comprise switching the switch from the open condition (charge accumulation) to a closed condition (discharge) and back to the open condition, or vice versa. The on/off of the MOSFET can be controlled by a clock signal. The detailed circuit and test configuration 700 is shown in FIG. 7l. A demonstration of sensing the tapping force is shown in FIGS. 7m to 7o with $f_s$ at 20 Hz, 40 Hz and 80 Hz respectively. The on-duration of the clock signal for each cycle is always 5 ms. As seen, for the $f_s$ of 20 Hz, the force sensing curve is quite smooth. This continuous and smooth force sensing curve cannot be achieved by conventional TENGs sensors but now can be easily achieved by SF-TENGs with a high $f_s$ recording system.

However, for a higher $f_s$, such as the 40 Hz and 80 Hz switching frequencies, the resolution of the sensing curves deteriorates. This is a noticeable issue for high $f_s$ recording. As seen from FIGS. 7m to 7o, a high $f_s$ provides a higher resolution but also reduces the amplitude of each peak—the peak is at 20 V for 20 Hz $f_s$ and 5 V for 80 Hz $f_s$. Since the total energy in one operation cycle (i.e. pressing and releasing cycle or bending and stretching cycle) is conserved and consumed by all peaks, a higher $f_s$ will reduce the energy for each sampled peak. Consequently, the amplitude is reduced. Since the τ is decoded from the exact waveform of each peak, the noise will attenuate the waveform and further deteriorate the accuracy of τ. A lower voltage amplitude makes the accuracy of the decoded τ more vulnerable to attenuation or distortion by noise. Therefore, there is a trade-off between the resolution (sampling frequency) and accuracy. A system with higher energy, resulting in a higher amplitude for each peak, can sustain a high $f_s$ without significant interference from noise, and can therefore enhance the accuracy of decoded τ.

Figure 8:
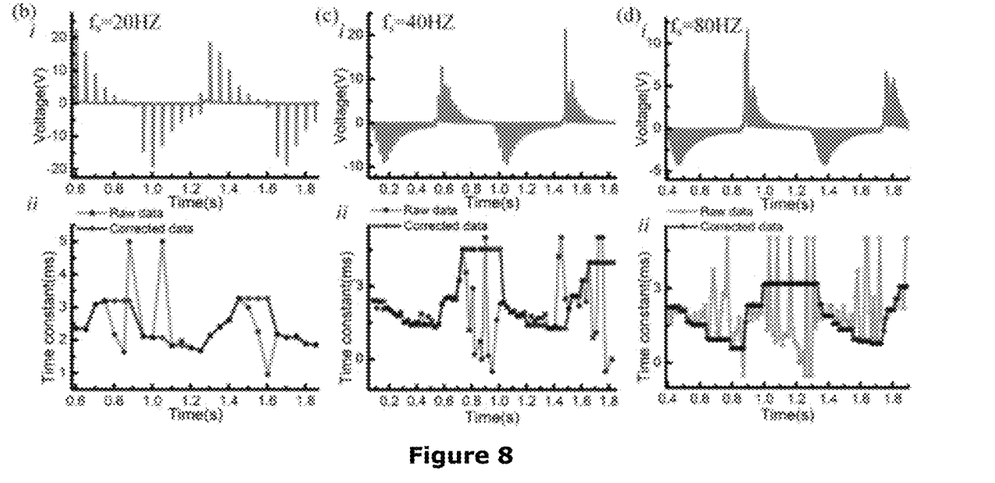
FIG. 8 schematically depicts an algorithm for correcting error data and a comparison of the data before and after correction.
Figure 9:
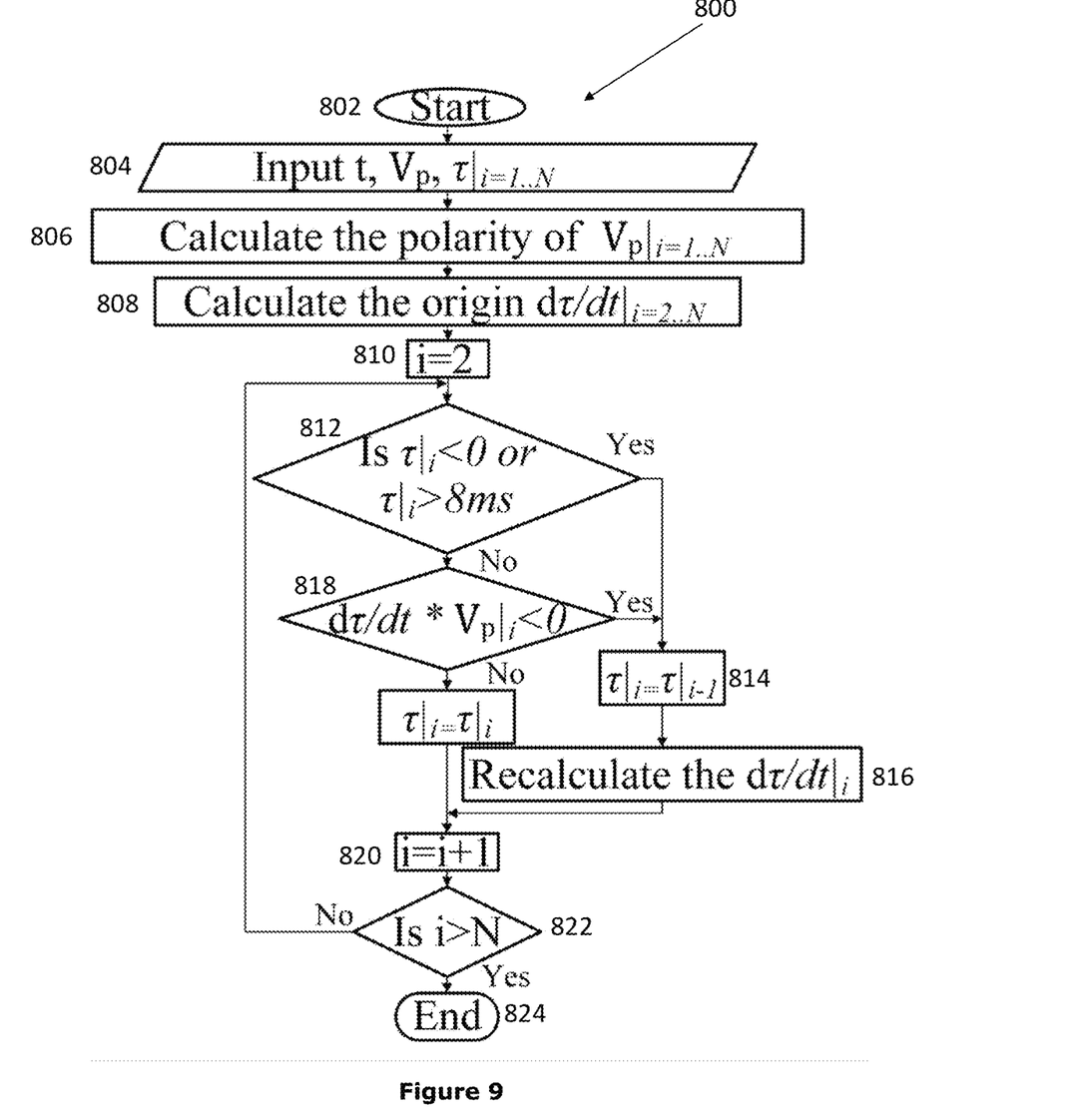
FIG. 9 is a flow chart for correcting error data.

FIG. 8 schematically depicts an algorithm for correcting error data and the comparison of the data before and after correction. There are always some data points, whose amplitude are very low, generating unreliable τ even if the $f_s$ is low. Thus, an algorithm is developed to find and correct these error data points with the information of dτ/dt and Vp. The flow chart is shown in FIG. 9 and comprises process start 802, at which the process 800 is initiated. Vp, time t and the time constants for at each time period i=1, . . . , N are inputted at 804. The polarity of Vp for each time period is calculated (806) as is the rate of change of the time constant over time dτ/dt (808). The algorithm performs error correction by reference to previous time constants—presently, the immediately preceding time constant. Thus, the time constant for i=1 has no prior reference. Therefore, step 810 takes the time constant for i=2. At 812, the process 800 checks if the time constant is outside an expected range—here, that range is 0 ms to 8 ms. If the time constant for i is outside the expected range, the time constant for i is set to be the same as the immediately preceding time constant (814). dτ/dt is then recalculated (816). If the time constant is determined, at 812, to be within the expected range the process or algorithm 800 determines if the derivative calculated at 808 has the same polarity as that of Vp (818). If not, steps 814 and 816 are performed. The process 800 then increments the time period i (820), and checks if all relevant time periods have been processed (822). If some time periods are yet to be processed, the process 800 continues from step 812. If all time periods have been processed, the process 800 ends (824). Thus, when error data is identified, the algorithm 800 sets the current time constant to be the same as the previous time constant, and recalculates the rate of change of the time constant over time. The principle of the flow chart in FIG. 9 is further explained below.

As shown in FIGS. 7g(iii), 7k(iii) and 7o(iii), the changing trend or form of curves of dτ/dt and Vp should match. Here the dτ/dt calculated from the τ curve is also vulnerable to the noise. However, the polarity of the Vp curve is less affected by the noise. Therefore, the algorithm may exploit polarity mismatches between dτ/dt and Vp to diagnose error. Since these error data occur when the force tends to stabilize, an approximation is applied that the force change for error data can be neglected. As a result, the error data receives the same T as the data point before it. This correction results in the flat curves shown in FIG. 7m to 7o. As seen, these flat curves tend to occur when the force reaches a maximum or minimum. A comparison of the decoded τ curves from before and after the correction are shown in FIGS. 8b to 8d, at 20 Hz, 40 Hz and 80 Hz respectively, with the measured voltage curves being curve (i) of each of FIGS. 8b to 8d and the curve (ii) being the τ curve before and after correction at the respective sampling frequency. For lower sampling frequencies, e.g. 20 Hz, fewer points need correction when compared with higher sampling frequencies, e.g. 80 Hz, due to the voltage amplitude decreasing with increased sampling frequency.

As described herein, switchable fabric-triboelectric nanogenerators (SF-TENGs) are proposed for the elimination of interference factors by measuring the r rather than the amplitude of the voltage output. The measured r, referring or relating to the instantaneous value of the capacitance of the device, is a stable and accurate indicator of the instantaneous value of the sensing target (e.g. force or bending) and is not affected by other interference factors such as humidity and electrostatic coupling with the environment. This sensing approach can be applied for both static sensing and dynamic sensing of force or bending. In static sensing, the current status of the device can be sensed. In dynamic sensing, a continuous profile of the sensing parameter, such as force and bending angle, can be generated. For a smoother profile of the sensing target, a MOSFET is used to replace the mechanical switch for a higher switching frequency. To improve the sensing accuracy, an algorithm is developed by using the voltage amplitude to correct the error sensing data. The same sensing approach can be easily extended to other application scenarios, such as gesture sensing and tilting angle sensing. For example, a gesture sensor may be provided, comprising one or more TE layers disposed at finger joints in a glove or other fabric, to receive one or more of a compressive force, tensile force and shear force on performance of a gesture, where the particular force or forces, their combination and peak amplitudes may be unique to a particular hand movement and therefore to a gesture. Similarly, a tilt angle sensor may be provided for by positioning a TENG as described herein to receive at least one of compressive force and tensile force during variation of an angle between two bodies or parts—e.g. two connected components of an articulated robotic arm.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A triboelectric nanogenerator (TENG), comprising:
   at least one triboelectric (TE) layer comprising two surfaces relative movement between which generates a TE charge; and
   a circuit comprising:
      a switch;
      a sensor; and a load,
wherein the switch has an open condition in which the TE charge accumulates (the accumulated TE charge), and a closed condition in which the accumulated TE charge discharges between the two surfaces across the load, the sensor determining a time constant (τ) of discharge of the accumulated TE charge across the load,
wherein the sensor is configured to determine a polarity of the accumulated TE charge based on a direction of discharge between the two surfaces, and wherein the sensor is configured determine a derivative of force with respect to time, based on a peak voltage of the accumulated TE charge that is discharged across the sensor.

2. The TENG of claim 1, being a contact-separation TENG having a releasing height determined based on spacing between the two surfaces and energy density on release.

3. The TENG of claim 1, wherein the circuit further comprises a diode for preventing the accumulated TE charge from discharging across the sensor during only one of pressing the two surfaces together and releasing the two surfaces to enable the two surfaces to move apart.

4. The TENG of claim 3, wherein the diode prevents the accumulated TE charge from discharging across the sensor during release.

5. The TENG of claim 1, wherein the switch operates cyclically based on a clock signal, each cycle comprising switching the switch from the open condition to the closed condition and back to the open condition.

6. The TENG of claim 5, wherein the clock signal cycles the switch at a frequency of at least 20 Hz.

7. The TENG of claim 5, wherein the clock signal cycles the switch at a frequency of at least 40 Hz.

8. The TENG of claim 5, wherein the clock signal cycles the switch at a frequency of at least 80 Hz.

9. The TENG of claim 5, wherein the switch comprises a transistor.

10. The TENG of claim 9, wherein the transistor is a metal oxide semiconductor field effect transistor (MOSFET).

11. The TENG of claim 1, wherein the sensor comprises the load.

12. The TENG of claim 1, comprising a plurality of said TE layers.

13. A gesture sensor comprising the TENG of claim 1, positioned to receive at least one of compressive force, tensile force and shear force during performance of a gesture.

14. A tilt angle sensor comprising the TENG of claim 1, positioned to receive at least one of compressive force and tensile force during variation of an angle between two bodies or parts.

* * * * *